United States Patent
Lee et al.

(10) Patent No.: US 7,464,426 B2
(45) Date of Patent: Dec. 16, 2008

(54) INTERNET-WASHER AND OPERATING METHOD THEREOF

(75) Inventors: Sang Su Lee, Changwon-shi (KR); Deung Hee Lee, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 669 days.

(21) Appl. No.: 10/362,740

(22) PCT Filed: Jul. 4, 2002

(86) PCT No.: PCT/KR02/01267

§ 371 (c)(1),
(2), (4) Date: Feb. 27, 2003

(87) PCT Pub. No.: WO03/004753

PCT Pub. Date: Jan. 16, 2003

(65) Prior Publication Data

US 2003/0176928 A1 Sep. 18, 2003

(30) Foreign Application Priority Data

Jul. 4, 2001 (KR) .................... 2001-39817
Jul. 4, 2001 (KR) .................... 2001-39818

(51) Int. Cl.
*D06F 33/02* (2006.01)
(52) U.S. Cl. .................... 8/147; 68/12.02
(58) Field of Classification Search ................ 68/12.01, 68/12.02, 13 R; 134/113
See application file for complete search history.

(56) References Cited

U.S. PATENT DOCUMENTS

| 5,424,940 | A | * | 6/1995 | Ousborne ................. 700/1 |
| 5,647,231 | A | * | 7/1997 | Payne et al. ............ 68/12.01 |
| 5,757,643 | A | | 5/1998 | Kuroda et al. |
| 5,839,097 | A | * | 11/1998 | Klausner ............ 340/825.69 |
| 6,374,079 | B1 | * | 4/2002 | Hsu ........................ 455/11.1 |
| 6,539,570 | B2 | * | 4/2003 | Youn et al. .................. 8/159 |
| 6,584,096 | B1 | * | 6/2003 | Allan ...................... 370/352 |
| 6,690,979 | B1 | * | 2/2004 | Smith ........................ 700/65 |
| 6,742,209 | B2 | * | 6/2004 | Jeon ........................... 8/159 |
| 6,763,687 | B2 | * | 7/2004 | Jo et al. ................. 68/12.01 |

(Continued)

FOREIGN PATENT DOCUMENTS

AU 730436 3/2001

(Continued)

*Primary Examiner*—Frankie L Stinson
(74) *Attorney, Agent, or Firm*—McKenna, Long & Aldridge LLP

(57) ABSTRACT

A method of controlling an Internet washing machine is disclosed, in which the electric power required to keep the Internet washing machine be in a remote-controllable state can be reduced. The method of controlling the Internet washing machine comprises the steps of counting down the remaining time from a point of time when the internet washing machine is turned on, starting a remote control mode by connecting an on-line server with the internet washing machine so that they are in a state of a session if an operating part does not work during the preset time, and starting a power saving mode if either the operating part does not work or a signal for remotely controlling the washing machine is not generated before the preset time from a point of time when the remote control mode is started.

9 Claims, 4 Drawing Sheets

U.S. PATENT DOCUMENTS

| | | | |
|---|---|---|---|
| 6,811,811 B2 * | 11/2004 | Gerald France et al. | 427/170 |
| 6,898,951 B2 * | 5/2005 | Severns et al. | 68/5 C |
| 6,980,079 B1 * | 12/2005 | Shintani et al. | 340/3.1 |
| 2001/0049846 A1 * | 12/2001 | Guzzi et al. | 8/158 |
| 2002/0013146 A1 * | 1/2002 | Albrecht | 455/420 |
| 2002/0013819 A1 * | 1/2002 | Lim et al. | 709/208 |

FOREIGN PATENT DOCUMENTS

| | | | |
|---|---|---|---|
| JP | 9-298773 | * | 11/1997 |
| JP | 10-094199 | | 4/1998 |
| JP | 10-276478 | * | 10/1998 |
| JP | 10-328474 | | 12/1998 |
| WO | WO-99/49680 | | 9/1999 |
| WO | WO-01/06335 A1 | | 1/2001 |
| WO | WO 01/06335 A1 | | 1/2001 |
| WO | WO 01/06335 A1 | | 1/2001 |
| WO | WO 01/28068 A1 | | 4/2001 |
| WO | WO-01/28068 A1 | | 4/2001 |
| WO | WO 01/28068 A1 | | 4/2001 |

* cited by examiner

INTERNET-WASHER AND OPERATING METHOD THEREOF

TECHNICAL FIELD

The present invention relates to an Internet washer and a control method thereof enabling to reduce a power consumed for maintaining a remotely controllable status of the Internet washer as well as inform conveniently a home client of information in accordance with a corresponding status in case that the power is applied to the Internet washer by a remote control.

BACKGROUND ART

Currently, every family enjoys convenient life style using a variety of home appliances.

For instance, an automated washer enables to prevent a client from wasting labor and time unnecessarily, a refrigerator enables to keep various kinds of food in store safely, and a microwave range enables to prepare food conveniently.

Specifically, the latest home appliances linked to Internet environments such as the Internet washer and the like show up in the market gradually. Hence, there is no restriction of time and space for washing the laundry since the entire operational control of the Internet washer, if necessary, can be made remotely.

Yet, in order to control remotely the Internet washer using the Internet environment, power of the Internet washer should be turned on all the time, whereby power consumption of the Internet washer increases inevitably.

Moreover, another home client is unable to be informed of the fact that the Power of the Internet washer is turned on by a remote control, whereby the operational control may be duplicated.

DISCLOSURE OF THE INVENTION

Accordingly, the present invention is directed to an Internet washer and a control method thereof that substantially obviate one or more of the problems due to limitations and disadvantages of the related art.

An object of the present invention is to provide an Internet washer and a control method thereof enabling to reduce power consumption for maintaining a remotely controllable status of the Internet washer.

Another object of the present invention is to provide an Internet washer and a control method thereof enabling to inform easily a home client of information in accordance with a corresponding status when power is applied to the Internet washer by a remote control.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an Internet washer according to the present invention includes a network interface being connected on-line for receiving a remote command from a remote user, an operation unit for receiving a local command manually inputted by a local user, a control unit getting a control signal in accordance with the remote command received through the network interface or the local command received through the operation unit, and a power control unit setting a current power mode of the washer to any one of power-on, power-off, and power-saving modes in response to the control signal generated by the control unit.

To further achieve these and other advantages and in accordance with the purpose of the present invention, a method of controlling an Internet washer, includes a first step of checking whether an input signal including a remote command is received through a network interface, a second step of extracting the remote command by decoding the input signal if it is found in the first step that the input signal is received, and a third step of performing a control function in accordance with the extracted control command.

To further achieve these and other advantages and in accordance with the purpose of the present invention, a method of controlling an Internet washer includes a first step of measuring a first time that a power of the Internet washer is turned on (ON), and a second step of establishing a session with an on-line server for being set to a remote control mode if a local command is not received through an operation unit within a first iod of time after the first time, and otherwise carrying out a control function according to the local command.

To further achieve these and other advantages and in accordance with the purpose of the present invention, a method of controlling an Internet washer includes a first step of counting a time from a time point that a power of the Internet washer is turned on (ON), a second step of switching to a remote control mode by establishing a session with an on-line server if an operation occurrence of an operation unit is not made within a setup time, and a third step of switching to a power saving mode if the operation occurrence of the operation unit or a reception for a remote control is not made until a time set up from a time point switching to the remote control mode expires.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
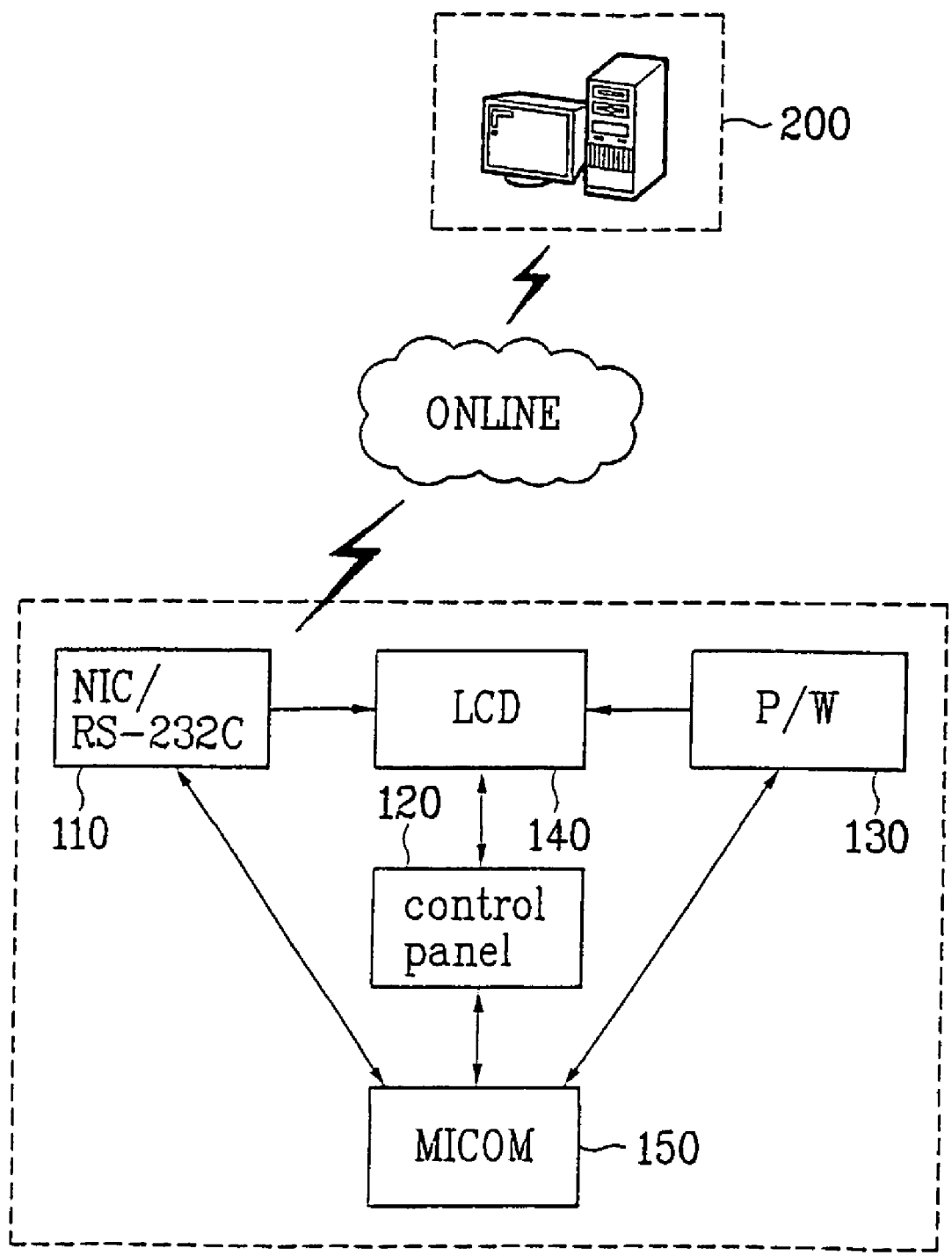
FIG. 1 illustrates schematically a block diagram of an Internet washer according to the present invention.

FIG. 1 illustrates schematically a block diagram of an Internet washer according to the present invention.

Namely, an Internet washer according to the present invention mainly includes a network interface 110, an operation unit 120, a power control unit 130, a display unit 140, and a control unit 150.

The network interface 110 is linked to an on-line remote control server 200 for remote control so as to receive/transmit various control data.

In this case, the remote control server 200 is a server in which a gateway program is installed to communicate with the respective home appliances remotely so as to be preferably built by a company as a manufacturer of the corresponding home appliance.

It is proposed as an embodiment that the network interface 110 is constructed with a network interface card(NIC) for enabling wire/wireless data communication.

Of course, the network interface 110 can be constructed with a port for data communication such as RS-232C. In this case, the port for data communication of the Internet washer is connected to a home automation system(or, additional PC, etc.) of the corresponding home, and built preferably so as to be interoperated with the home automation system.

And, the operation unit 120 constructing the Internet washer according to the present invention is implemented so as to be controllable manually by a client.

The operation unit 120 includes a control panel using a general button or dial system as well as a touch screen.

And, the power control unit 130 carries out a function of controlling supply/cut-off of power to the Internet washer, or a function of maintain & release of a power saving mode.

In this case, the power saving mode is a status mode that a minimum power enabling to turn 'ON' a power of the Internet washer is provided by an electrical control while the power of the Internet washer is turned 'OFF'.

And, the display unit 140 caries out a function of displaying a current status of the Internet washer so that the client is informed of the current status, and includes a general LCD, etc.

In this case, the current status of the Internet washer includes a manual operation status, operating status according to each control, on/off of remote control, reception of various information, and the like.

Moreover, the display unit can be built to be separated from the foregoing-explained operation unit 120, or implemented together with the operation unit 120.

Namely, the operation unit 120 can carry out the function of the display unit if including the touch panel.

And, the control unit 150 carries out a control according to an external signal received through the network interface 110 and an operation control according to an operation of the operation unit 120.

In this case, the control unit 150 may be a general microcomputer(MICOM) which interoperates with other various components so as to perform operational controls for the respective components as a whole.

Figure 2:
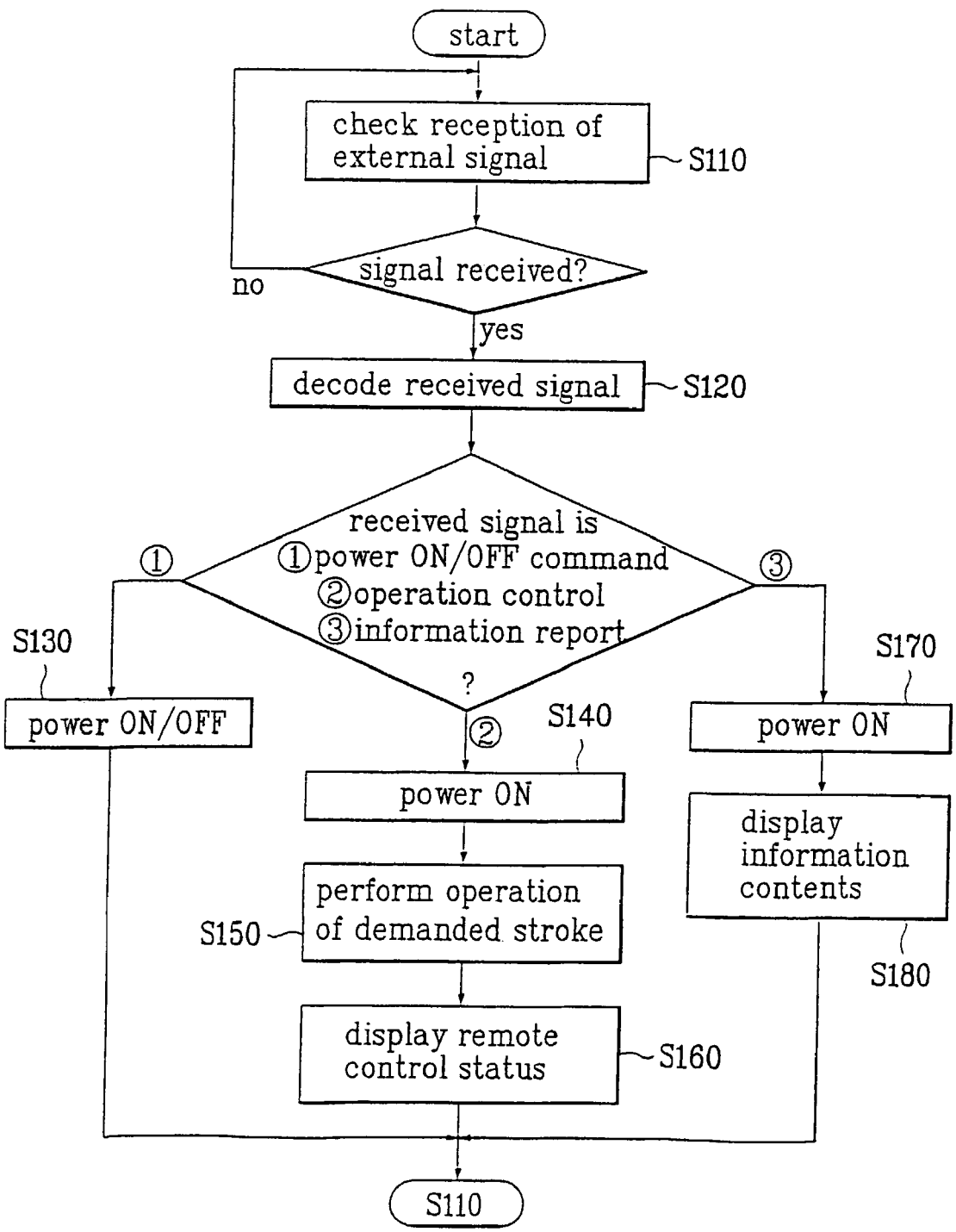
FIG. 2 illustrates a flowchart of a method of controlling an Internet washer according to a first embodiment of the present invention.
Figure 3:
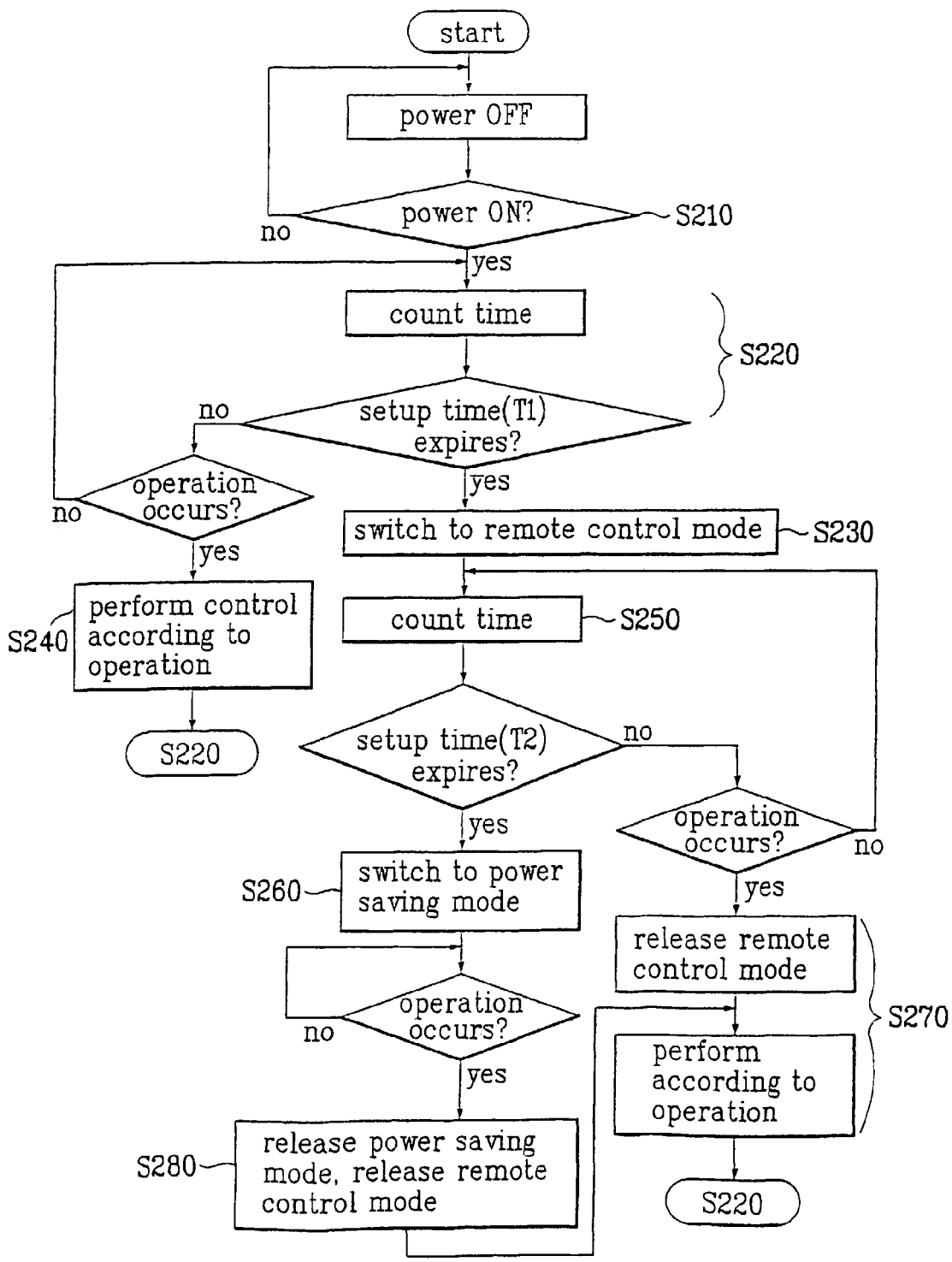
FIG. 3 illustrates a flowchart of a method of controlling an Internet washer according to a second embodiment of the present invention.
Figure 4:
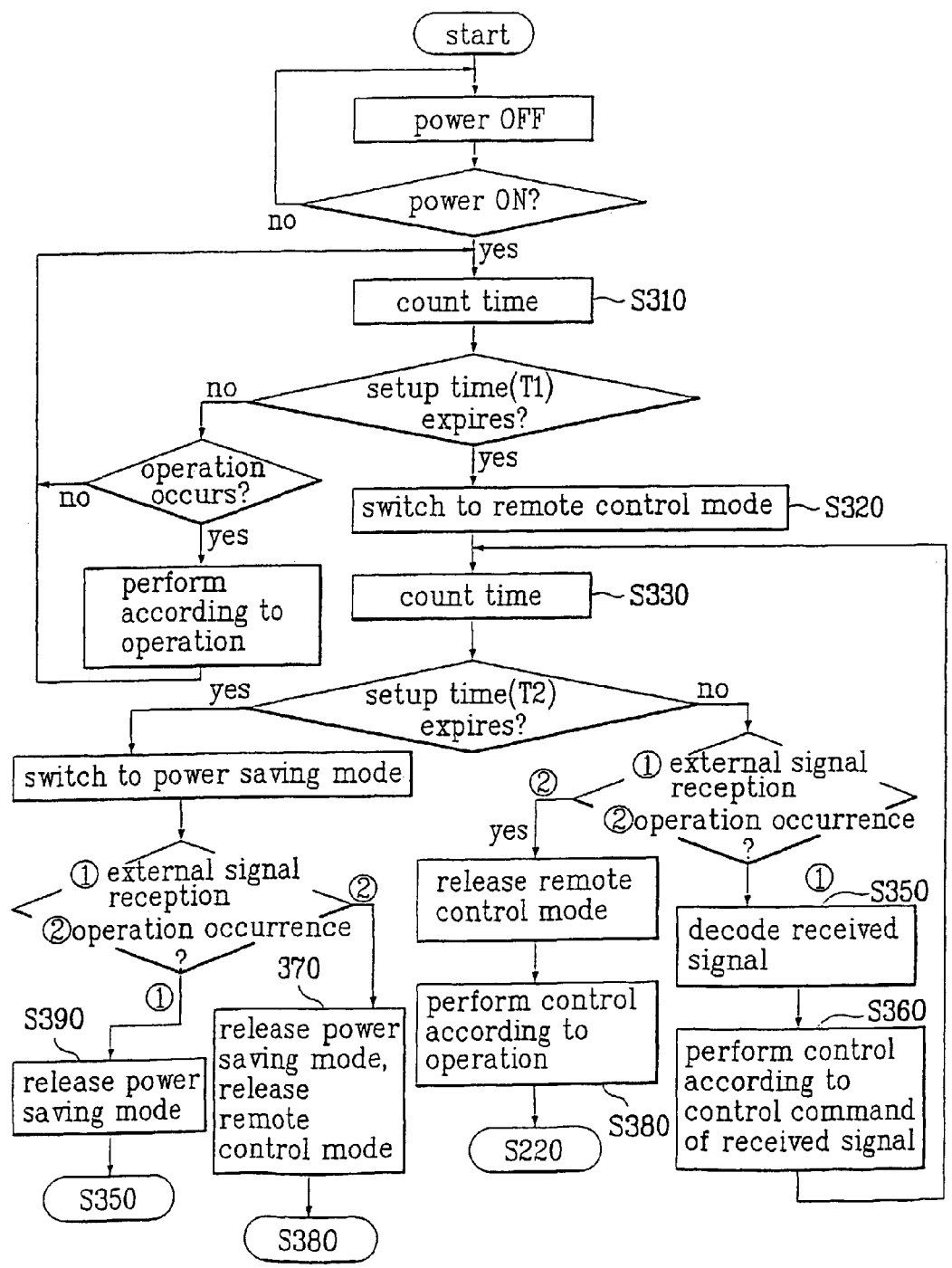
FIG. 4 illustrates a flowchart of a method of controlling an Internet washer according to a third embodiment of the present invention.

Methods of controlling the Internet washer using the above-mentioned constitution according to embodiments of the present invention are explained by referring to flowcharts in FIGS. 2 to 4 as follows.

A control method according to a first embodiment of the present invention is for performing a power control of the Internet washer when an external signal is received through on-line.

This is explained in detail by referring to the flowchart in FIG. 2 as follows.

First of all, the control unit 150 checks continuously whether an external signal is received or not through the network interface 110 so as to enable the control (S110).

In this case, the network interface 110 is linked on-line, thereby receiving signals relating to various controls or various information reports continuously from the home automation system built in the corresponding home, the remote control server 200 built at a remote place, or the server network enabling data communication with the Internet washer.

The signals relating to the various controls may include signals of controlling on/off of power, strokes relating to various laundry works(washing, rinse, dehydration, etc), and the like.

The network interface 110 transfers data of the signal to the control unit 150 if receiving the external signal including a specific control command during the above process.

In this case, the control unit 150 decodes the received external data signal so as to interpret the control command (S120).

Namely, it is interpreted whether the data is the control command for on/off of the power, operation of the strokes relating to the various laundry works, or the various information reports.

And, the control unit 150 carries out the power control in accordance with the interpreted control command.

For instance, if the interpreted control command is the command for turning 'ON' the power of the Internet washer, the control unit 150 controls the power control unit 130 so as to turn 'ON' the power(S130).

On the contrary, if the interpreted control command is the command for turning 'OFF' the power of the Internet washer, the control unit 150 controls the power control unit 130 so as to turn 'OFF' the power(S130).

In this case, the control for the 'OFF' of the power is a function provided for terminating forcibly a performance of the laundry stroke from a remote place if the client goes out after turning 'ON' the power of the Internet washer.

Moreover, if the interpreted control command is a control command relating to the stroke relating to the various laundry works, the control unit 150 controls the power control unit 130 so as to turn 'ON' the power(S170). Thereafter, contents of the received information are displayed through the display unit 140(S180).

In this case, the various information may include a report according to registration of new control data, a notification for various services, a message transmitted to the home client by a remote client, and the like.

A series of controls according to the first embodiment are preferably carried out when the power of the Internet washer is at the power saving mode, and can be performed when the laundry-relating strokes are in progress.

Meanwhile, a control method according to a second embodiment of the present invention enables to carry out a switch to the power saving mode in order to prevent unnecessary power consumption as well as another switch to a remote control mode if a manual operation of the Internet washer fails to be performed within a predetermined time.

This is explained in detail by referring to a flowchart in FIG. 3 as follows.

First of all, the control unit 150 checks continuously that the power is turned 'ON' while the power of the Internet washer is being turned 'OFF' initially(S210).

In this case, the term of 'ON' of the power means a status that a power enabling the operation of the Internet washer is being supplied thereto, and the other term of 'OFF' of the power means a status that the power can be turned 'ON' by the control of the power control unit 130 even if the operation of the Internet washer is impossible.

Once the 'ON' of the power is achieved under the above status, the control unit 150 counts a time so as to check whether additional operation is carried out or not within a setup time T1(S220).

In this case, the additional operation may be the manual operation of the client through the operation unit 120.

If the operation of the operation unit 120 fails to occur within the setup time during the above process, the control unit 150 connects the network interface 110 to the on-line server by session link.

Therefore, the Internet washer is set to the remote control mode enabling the remote control on-line(S230).

If the operation of the operation unit 120 occurs within the setup time during the above process, the control unit 150 performs the control in accordance with the corresponding operation(S240).

Of course, once the control is ended, the time count is carried out again from the very point of time so as to achieve a switch to the remote control mode status if there is no additional operation within the setup time T1.

Moreover, when the Internet washer is switched to the status of the remote control mode, the control unit 150 carries out a count of additional time(S250).

Thereafter, if operation of the operation unit 120 fails to occur within an additional setup time T2, the control unit 150 carries out a power control for changing the status of the Internet washer into the power saving mode(S260).

For instance, if 5 minutes lapses while the Internet washer maintains the status of the remote control mode, the power control for changing the status into the power saving mode is carried out.

In this case, the status change into the power saving mode is performed in a manner that the power of the Internet washer is turned 'OFF' and a minimum power enabling to turn 'ON' of the power is provided by an electrical control only.

If the operation of the operation unit 120 occurs within the additional setup time T2, the control unit 150 carries out a control according to the corresponding operation as well as a release of the remote control mode(S270).

Moreover, when the occurrence of the operation through the operation unit 120 is performed at the status of the power saving mode, the releases of the power saving mode and the remote control mode are carried out simultaneously and a control according to the operation is carried out(S280).

Meanwhile, the control methods according to the first and second embodiments of the present invention are applied to a control method according to a third embodiment of the present invention.

Namely, the control method according to the third embodiment of the present invention is the most preferable embodiment enabling to control effectively the Internet washer according to the present invention.

This is explained by referring to a flowchart in FIG. 4 as follows.

In this case, overlapped explanation with the description of the first and second embodiments for the detailed controls is skipped in the following description of the third embodiment of the present invention.

First of all, an initial control status is equivalent to that of the second embodiment of the present invention.

Namely, if the operation occurrence of the operation unit 120 fails to be performed within a predetermined time T1 under the condition that a time is counted(S310) while the power of the Internet washer is turned 'ON', the control unit 150 makes the Internet washer be at the remote control mode (S320).

Detailed explanation for this is mentioned in the foregoing description, thereby being skipped in the following.

And, if a control of the operation unit 120 fails to be achieved within a predetermined time T2 of reception of the external signal fails to occur when a time is counted at the remote control mode status, the control unit 150 makes the Internet washer have a power saving mode status(S340).

In this case, for the reception of the external signal, whether the signal is received or not can be interpreted on-line through the network interface 110 by having the control unit 150 communicate with the network interface 110 continuously.

If the reception of the external signal is made through the network interface 110 before the change into the power saving mode is carried out, the external signal is decoded(S350), a control for this decoded control command is carried out (S360), and then a count of time is performed again from a point of time that the control is completed(S330).

Meanwhile, if operation of the operation unit 120 is achieved while the status of the power saving mode is maintained, the control unit 150 carries out releases of both of the power saving mode and remote control mode(S370) as well as performs a control in accordance with the corresponding operation(S380).

On the other hand, if the reception of the external signal is achieved through the network interface 110 instead of the operation of the operation unit 120 while the status of the power saving mode is maintained, the release of the power saving mode is achieved only(S390).

In this case, the release of the power saving mode means that the power is applied to the Internet washer so as to be changed into the status enabling a remote operation control.

Namely, the status of the Internet washer is changed so as to be controllable only for the control command received through the network interface 110.

In this case, the control for the control command is explained in the description of the first embodiment of the present invention, whereby detailed explanation is skipped.

Of course, it is preferable that a duplicated operation control by a home client is prevented by having the display unit 140 display the contents that the remote control is being activated.

Yet, it is more preferable that the home client enables to terminate the remote control forcibly.

For this, the control unit 150 carries out the release of the remote control mode as well as the control in accordance with the operation command by manual operation.

INDUSTRIAL APPLICABILITY

Accordingly, the service system and method according to the present invention enable a client at a remote place to provide the other client staying at home with a message through the home appliance, thereby enhancing various functions of each home appliance.

Moreover, the service system and method according to the present invention enable the client staying at home to be informed correctly of the message transmitted through the home appliances, thereby enabling to improve a reliance for the services.

Therefore, the present invention is greatly useful for industry.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of controlling an Internet washer, comprising:
a first step of measuring a first time that a power of the Internet washer is turned on (ON); and
a second step of establishing a session with an on-line server for being set to a remote control mode if a local command is not received through an operation unit within a first period of time after the first time, and otherwise carrying out a control function according to the local command.

2. The method of claim 1, further comprising the steps of:
measuring a second time that the session for being set to the remote control mode is established; and
carrying out a power control function for being set to a power saving mode if the local command is not received with a second period of time after the second time.

3. The method of claim 2, further comprising a step of exiting from the remote control mode and carrying out the control function according to the local command if the local command is received within the second period of time after the second time.

4. The method of claim 2, wherein the power saving mode is a mode of a status that a minimum power enabling to turn on the power is provided while the power of the Internet washer is turned off.

5. A method of controlling an Internet washer, comprising:
a first step of counting a time from a time point that a power of the Internet washer is turned on (ON);
a second step of switching to a remote control mode by establishing a session with an on-line server if an operation occurrence of an operation unit is not made within a setup time; and
a third step of switching to a power saving mode if the operation occurrence of the operation unit or a reception for a remote control is not made until a time set up from a time point switching to the remote control mode expires.

6. The method of claim 5, further comprising a step of carrying out a release of the remote control mode if the operation occurrence of the operation unit is made while the third step is carried out.

7. The method of claim 5, further comprising a step of counting a time for switching to the power saving mode again from a completing time point of a control corresponding to the received signal if the reception of the signal for the remote control is made while the third step is carried out.

8. The method of claim 5, further comprising a step of releasing the power saving and remote control modes if the operation occurrence of the operation unit is made while the Internet washer maintains the power saving mode through the third step.

9. The method of claim 5, further comprising a step of releasing the power saving mode only if the reception of the signal for the remote control is made while the Internet washer maintains the power saving mode and counting a time for switching to the power saving mode again from a time point completing a control corresponding to the received signal.

* * * * *